(12) United States Patent
Patten et al.

(10) Patent No.: US 8,490,135 B2
(45) Date of Patent: Jul. 16, 2013

(54) VIRTUAL MEDIA CHANNELS

(75) Inventors: Michael J. Patten, Sammamish, WA (US); James T. Walter, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/463,514

(22) Filed: May 11, 2009

(65) Prior Publication Data
US 2010/0287587 A1 Nov. 11, 2010

(51) Int. Cl.
*H04N 5/445* (2011.01)

(52) U.S. Cl.
USPC .............................. 725/46; 725/39

(58) Field of Classification Search
USPC ....................................... 725/39, 46
See application file for complete search history.

(56) References Cited

U.S. PATENT DOCUMENTS

| 6,772,147 | B2 | 8/2004 | Wang |
| 7,174,126 | B2 * | 2/2007 | McElhatten et al. ......... 455/3.04 |
| 8,024,762 | B2 * | 9/2011 | Britt ................. 725/92 |
| 2003/0151621 | A1 | 8/2003 | McEvilly et al. |
| 2004/0060063 | A1 | 3/2004 | Russ et al. |
| 2005/0076092 | A1 | 4/2005 | Chang et al. |
| 2005/0108770 | A1 | 5/2005 | Karaoguz et al. |
| 2005/0289617 | A1 | 12/2005 | Safadi et al. |
| 2006/0041921 | A1 | 2/2006 | Hane |
| 2006/0123455 | A1 | 6/2006 | Pai et al. |
| 2006/0212904 | A1 * | 9/2006 | Klarfeld et al. ................. 725/46 |
| 2007/0199019 | A1 | 8/2007 | Angiolillo et al. |
| 2007/0217436 | A1 * | 9/2007 | Markley et al. ............... 370/401 |
| 2008/0195664 | A1 * | 8/2008 | Maharajh et al. .......... 707/104.1 |
| 2010/0251304 | A1 * | 9/2010 | Donoghue et al. ............. 725/46 |

FOREIGN PATENT DOCUMENTS
WO 0213521 A1 2/2002

OTHER PUBLICATIONS

Macrovision's Next Generation Interactive Program Guide, Data Sheet, dlna Technology Component, http://www.macrovision.com/webdocuments/PDF/ds_NextGenIPG_Jan2009.pdf?link_id=productsProductLiterature.

* cited by examiner

*Primary Examiner* — Kieu Oanh T Bui
(74) *Attorney, Agent, or Firm* — Vierra Magen Marcus LLP (57) ABSTRACT

Methods for displaying a user's personal media content via an EPG that also displays third-party broadcast television channels. Personal media content associated with a user is retrieved from one or more networks, and aggregated by type of media. The personal content media is further sorted into groups of media content sharing a common attribute. A virtual media channel is created for each group of media, and is added to the EPG. Each virtual media channel is populated with the user's personal media content affiliated with the group.

15 Claims, 10 Drawing Sheets

VIRTUAL MEDIA CHANNELS

BACKGROUND

Selecting to view a broadcast television program is often done via an electronic program guide (EPG). Conventional EPGs are displayed on a grid. Typically, the vertical axis of the EPG grid displays the available channels and the horizontal axis of the EPG grid displays the time. Each intersection of the vertical axis (channel) with the horizontal axis (time) displays an airing of a broadcast television program. The viewer may scroll along both the horizontal axis and vertical axis to identify television programs being broadcast at different times and on different channels.

There is currently no similar format available for aggregating, accessing and viewing a user's personal media content (e.g., music, digital photographs, etc.). Users store media content in various places; often on machines located in their local network and one or more third-party services. Over time, it becomes difficult for a user to locate and/or view their media content stored in these various locations. A user may forget where certain content is located in the local network. Similarly, if a user stores their media content on various third-party services, the user must individually visit each of the third-party services in an effort to find the content they are looking for.

SUMMARY

One aspect of the present technology is to provide a user the ability to view their personal media content via an electronic program guide, regardless of where the media content is actually stored. The user's personal media content is identified on various machines and third-party services, retrieved and aggregated by type of media. Each type of media is sorted into groups of media content whereby each instance of media content within a group shares a common attribute. A new virtual media channel is added to an existing electronic program guide for each group of media content. Each new virtual media channel added to the electronic program guide is populated with the media content affiliated with the group.

The virtual media channels allow a user to access their personal media content via the EPG using channel numbers similar to conventional broadcast television channels. A range of existing broadcast television channels in the EPG is identified. A new range of virtual media is designated in the EPG for each type of media associated with the user's personal media content. For example, the EPG may include a dedicated range of virtual music channels, a dedicated range of virtual image channels, and a dedicated range of virtual video channels in the EPG. These virtual media channels are displayed in-line with the third-party broadcast television channels in the EPG.

DETAILED DESCRIPTION

The technology described herein displays a user's personal media content in an electronic program guide (EPG) in a media-specific format. The technology aggregates the user's personal media content into virtual media channels, which are displayed in-line with existing third-party broadcast television channels in the EPG in a setting familiar to the user. The EPG enables users to access their personal media content in a consistent basis regardless of the source of the media content.

The present technology will now be described in reference to FIGS. 1-11. Users store personal media content in various places on their local network (also referred to as a "home network"), as well as various third-party services (e.g., Flickr, Facebook, etc.). The term "personal media content" is used herein to refer to any type of media associated with a user that may be stored in a digital format such as, but not limited to, an image file (e.g., digital photograph), an audio file (e.g., music), a video file, and the like.

Figure 1:
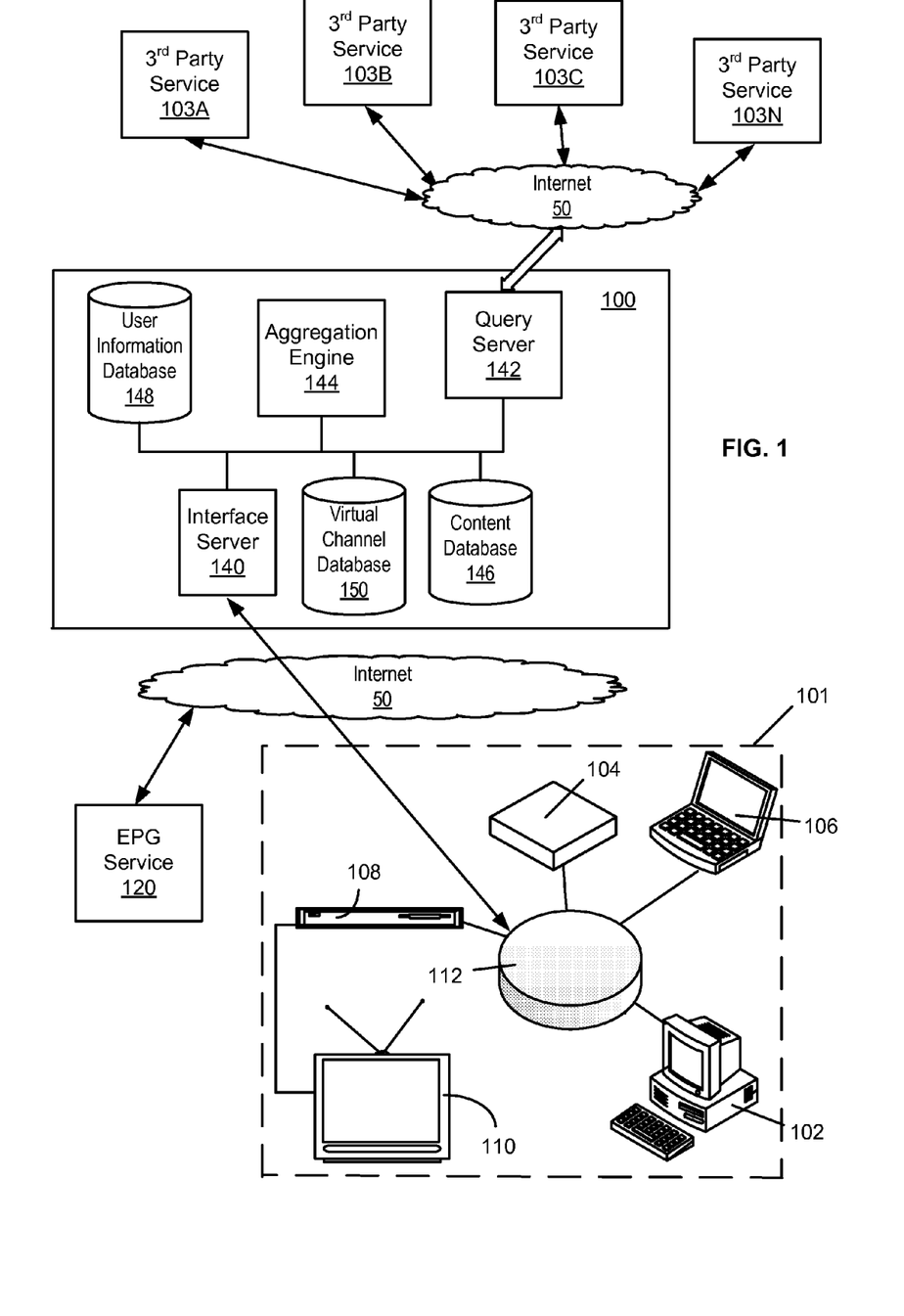
FIG. 1 depicts an exemplary media system according to the present technology.

FIG. 1 illustrates an exemplary system 100 for storing a user's personal media content and generating virtual media channels. The system 100 may include an interface server 140, which provides user interface access to the system 100 from a user's home network 101 via the Internet 50. The system 100 is not limited to a browser based user interface. It is within the scope of the technology described herein for the system 100 to operate in connection with other devices that generate and display an EPG such as, but not limited to, a set-top box, game consoles, smart phones, personal computers, and the like. A set-top box may be configured to accept a signal source from, by way of example only, an Ethernet cable, a satellite dish, a coaxial cable, a telephone line (including DSL connections), Broadband over Power Line, or even an ordinary VHF or UHF antenna.

The system 100 may also include a query server 142, which accepts and forwards media content from the third-party services 103 via the Internet 50 from and to the content database 146. As will be described in more detail later, the user's personal media content (as well as friend's media content) is stored in the content database 158 and the virtual channels created by the system 100 are stored in the virtual channel database 150. The user's personal media content (as well as friend's media content) is displayed to a user via a hardware device in the home network 101 (e.g., PC 102, laptop 106, television 110) within a virtual channel via the Internet 50.

The system 100 may also include an aggregation engine 144 and user information database 148. As will be described in more detail later, the aggregation engine 144 aggregates like media content received from the third-party services 103. The user information database 148 stores user profile information related to the user (e.g., social networking sites, content hosting services, etc.). In some embodiments, a user has to link their user ID with each third-party service 103 provider so that the system 100 may authenticate the user with the third-party service. Typically this involves the user specifying their username and password for the third-party service. In some embodiments, a user may add their account information (e.g., username, email address, content access level, etc.) for one or more third-party content providers to their profile page (not shown) using the web browser 104. On example of such a profile page is profile.live.com. It is within the scope of the technology to store and organize profile information by other means.

The home network 101 is suitable for accessing the user's personal media content stored on the hardware devices in the home network 101 via a local area network (LAN) 112, and presenting the user's personal media content obtained from the home network 101 and third-party services 103 in virtual media channels displayed in an EPG. The home network 101 shown in FIG. 1 includes several hardware devices, including a personal computer (PC) 102, a storage device 104, a laptop computer 106, a set-top box 108 and a television 110.

Using the home network 101 shown in FIG. 1, the hardware devices that a user may use to view a conventional EPG includes the television 110, the PC 102 (with a tuner card), and/or the laptop 106 (with a tuner card). A conventional EPG is a digital guide to scheduled broadcast television, typically displayed on-screen with functions allowing a user to navigate, select, and discover television content by time, title, channel, genre, etc. by use of a remote control, a keyboard, or any other input devices know today. The configuration of the home network 101 shown in FIG. 1 is exemplary only, and is not intended to limit the scope of the technology disclosed herein. Today, a user must search each hardware device in his home system for media files or, at a minimum, search through media libraries created by a media system or the user. Either way, the user's personal media content is not easily accessible or displayed in a format that is familiar to a user.

FIG. 1 illustrates that each of the hardware components within the home network communicate with each other via a wired LAN 112. It is within the scope of the present technology for one or more of the hardware devices to communicate with each other over a wireless LAN 112. For example, the PC 102 may communicate with the television 110 via a wireless network. It is within the scope of the technology for any of the hardware devices within the home network 101 to communicate wirelessly with the Internet 50.

A third-party service 103 may be any third-party media sharing website, media networking website, community platform, social networking website, blog, and the like that a user may use to store personal media content. A third-party service 103 may also include the user's own website, blog, etc. FIG. 1 illustrates that more than third-party service 103 (e.g., 103A, 103B, 103C . . . 103N) may be queried by the system 100.

FIG. 1 illustrates that the on-screen data displayed in an EPG is provided by a third-party EPG service 120. In some embodiments, data provided by the EPG service 120 is available via a broadcast channel. In other embodiments, the data provided by the EPG service 120 is exposed as a web service to any of the hardware devices in the user's home network 101 via the Internet 50.

Figure 2:
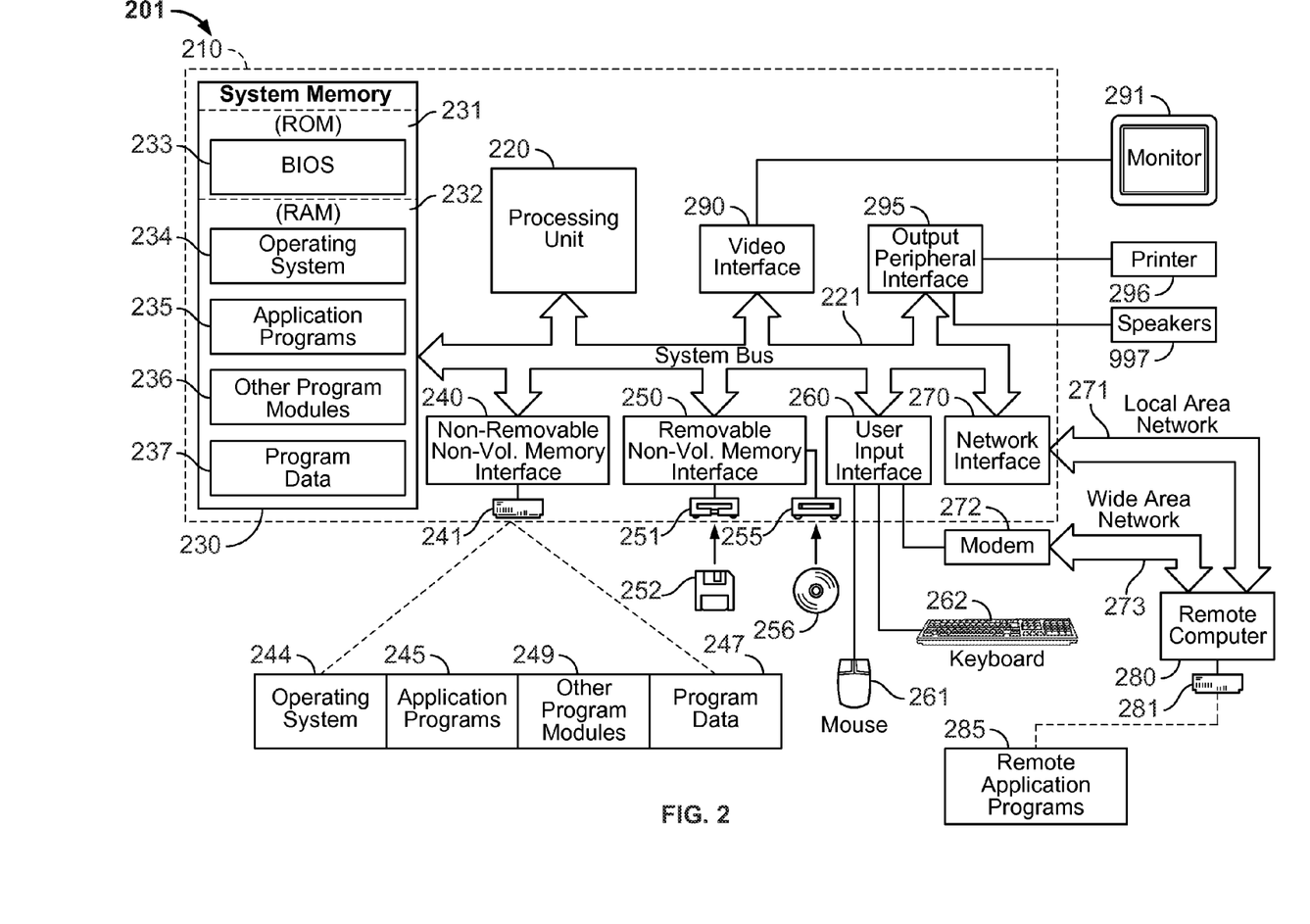
FIG. 2 depicts a schematic diagram of a computer for performing each of the methods described herein.

With reference to FIG. 2, an exemplary system for implementing the technology described herein includes a general purpose computing device in the form of a computer 210. Components of computer 210 may include, but are not limited to, a processing unit 220 (which can include multiple processors), a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data. By way of example, and not limitation, communication media includes wired media such as a wired network or direct-wired connection, and wireless media such as RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 146, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 171 through a network interface or adapter 270. When used in a WAN networking environment, the computer 210 typically includes a modem 272, network interface or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
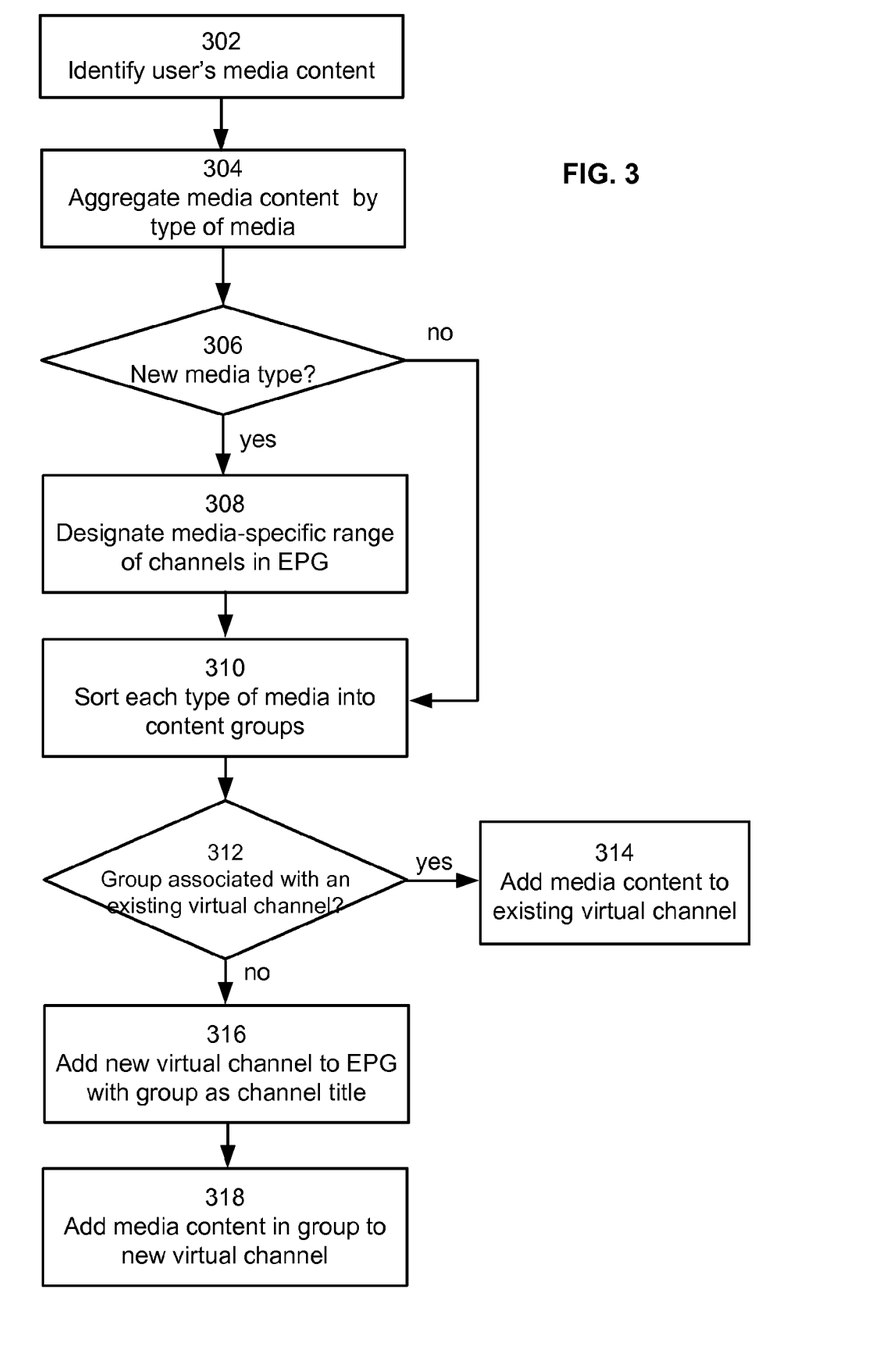
FIG. 3 depicts a flow diagram illustrating exemplary steps for creating a virtual media channel.

FIG. 3 illustrates exemplary steps for creating virtual media channels in-line with a conventional EPG that also displays third-party broadcast television channels. At step 302, the technology identifies the user's personal media content. Using the example provided in FIG. 1, the technology identifies the user's personal media content located on both the home network 101 and the third-party services 103. Additional details of retrieving the user's media content will be provided later with reference to FIG. 4.

Virtual media channels are organized in the EPG by type of media to provide the user with a consistent way to locate their personal media content. The phrase "type of media" is intended to refer to a category of content such as, but not limited to, music, photographs, video, and the like. These types of media are exemplary only, and are not intended to limit the scope of the technology described herein. At step 304, the technology begins to organize the user's media content retrieved from the home network 101 and various third-party services 103 by aggregating the retrieved personal media content by type of media.

In some embodiments, the user's personal media content is aggregated by type of media based on metadata entries associated with each media file. In other embodiments, the technology aggregates the user's personal media content by type of media based on the file extension associated with each media file. As a result of step 304, like types of personal media content have been aggregated together; music files are aggregated together, image files are aggregated together, and so on.

At step 306, the technology determines if the conventional EPG includes at least one virtual channel associated with each type of media identified at step 304 (used to aggregate like content). By way of example only, if the technology aggregates music files together (step 304), the technology determines if the conventional EPG contains any virtual music channels. If the conventional EPG does not contain any virtual music channels, the technology continues to step 308. The same is true for determining whether the convention EPG contains image files, etc.

At step 308, in some embodiments, the technology reserves a range of virtual media channels for each type of media identified at step 304. For example, if the system 100 aggregates the user's personal media content into music files and image files, the system 100 reserves a range of virtual channels for virtual music channels and another range of virtual channels for virtual image channels in the EPG, at step 308. In other embodiments, the technology may ask the user to designate a range of virtual channels for the type of media. Either way, the range of virtual media channels for the type of media is fixed. Reserving a specific range of virtual media channels for each type of media allows a user to navigate to the same section of the EPG to access a certain type of content. The system 100 coordinates with the EPG data provider 120 to determine the range of broadcast television channels that could be displayed in the user's EPG, and reserves a range of virtual channels that will not overlap with the broadcast television channels. For example, even though a conventional EPG may only display broadcast television channels 1-1000, the technology may reserve (or the user may designate) channels 3000-3499 for virtual music channels, channels 3500-3999 for image channels, and so on.

If, however, the conventional EPG already contains at least one virtual media channel associated with a certain type of media (e.g., image, music, etc.), the technology recognizes that a range of virtual channels has already been reserved for the type of media, and proceeds to step 310. In other words, if the technology identifies that the conventional EPG already contains at least one virtual music channel, the technology recognizes that a range of virtual channels has already been reserved for music and a virtual music channel will be created within the reserved range of channels. Similarly, if the technology identifies that the conventional EPG already contains at least one virtual photograph channel, video channel, image channel, etc., the technology recognizes that a range of virtual channels has already been reserved for the particular type of media and a virtual channel will be created within the reserved range.

At step 310, the user's personal media content, which has been aggregated by type of media in step 304, is further sorted into content groups by the aggregation engine 144. In one embodiment, content groups are created based on tags associated with the media files. The term "tags" refers to metadata entries associated with each media file that describe one or more attributes of a media file. Metadata entries may be added to a media file by a user, the content provider, a digital media player, and the like. Additional detail about step 310 will be provided later with reference to FIG. 5. As will be described in more detail later, the content groups created by the aggregation engine 144 serve as the basis for each virtual media channel in the EPG.

Figure 9:
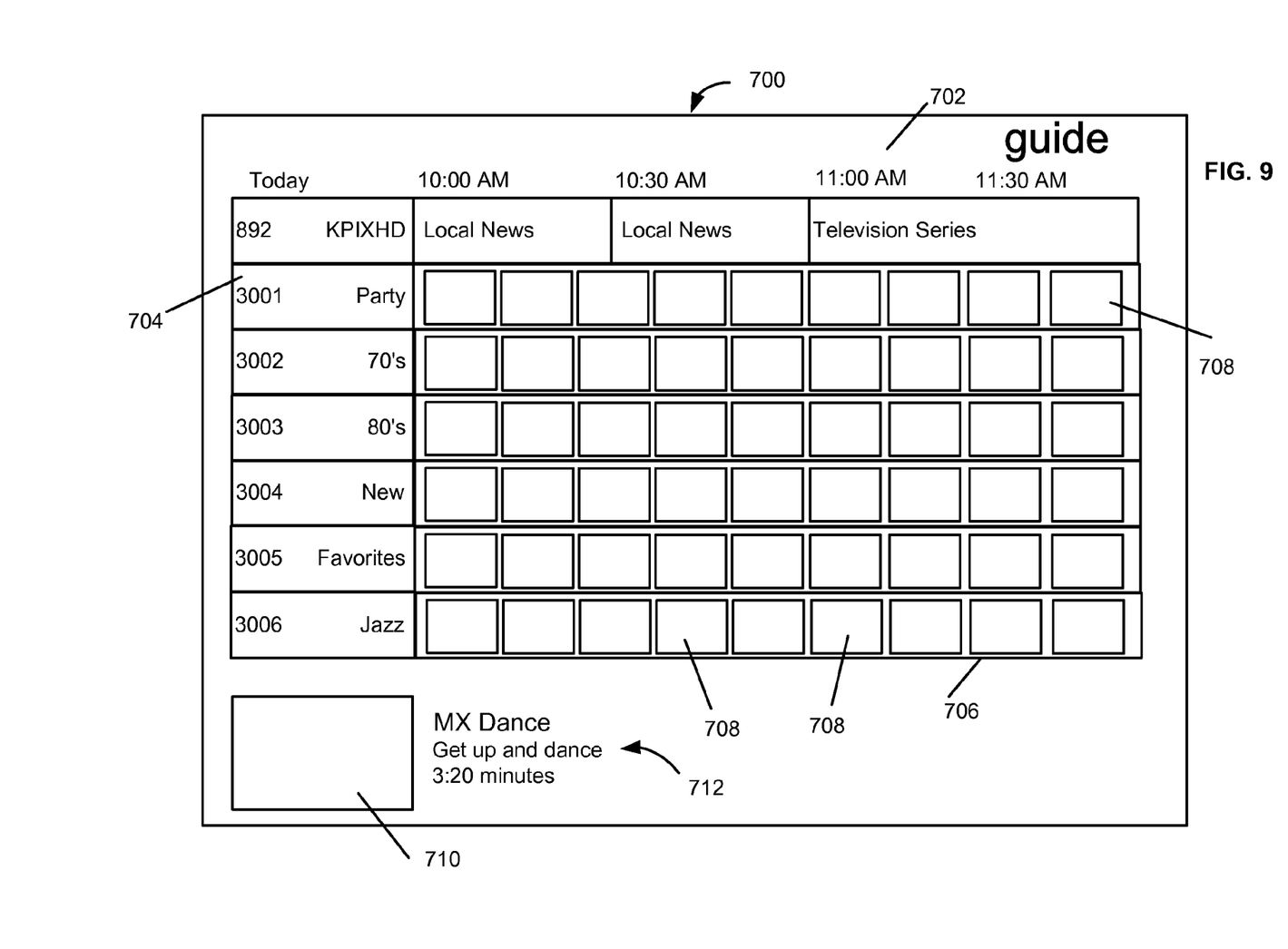
FIG. 9 depicts an exemplary EPG displaying virtual media channels.
Figure 10:
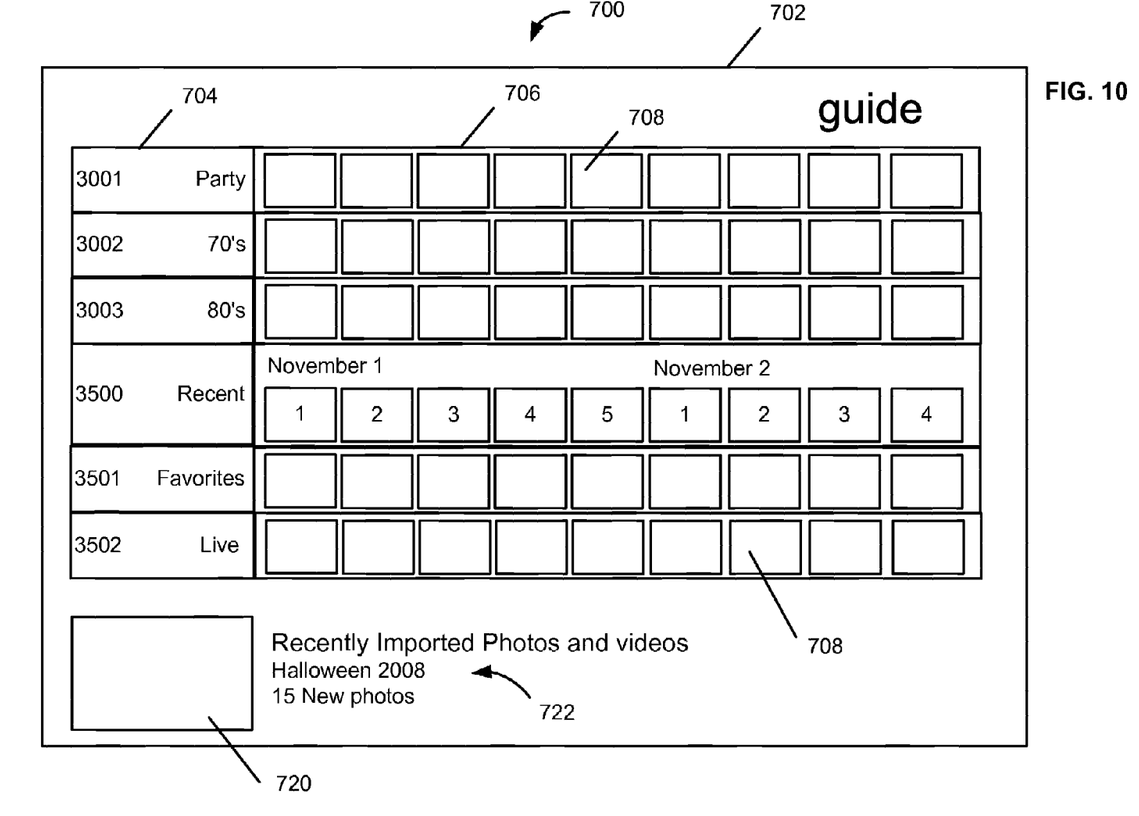
FIG. 10 depicts an exemplary EPG displaying additional virtual media channels.
Figure 11:
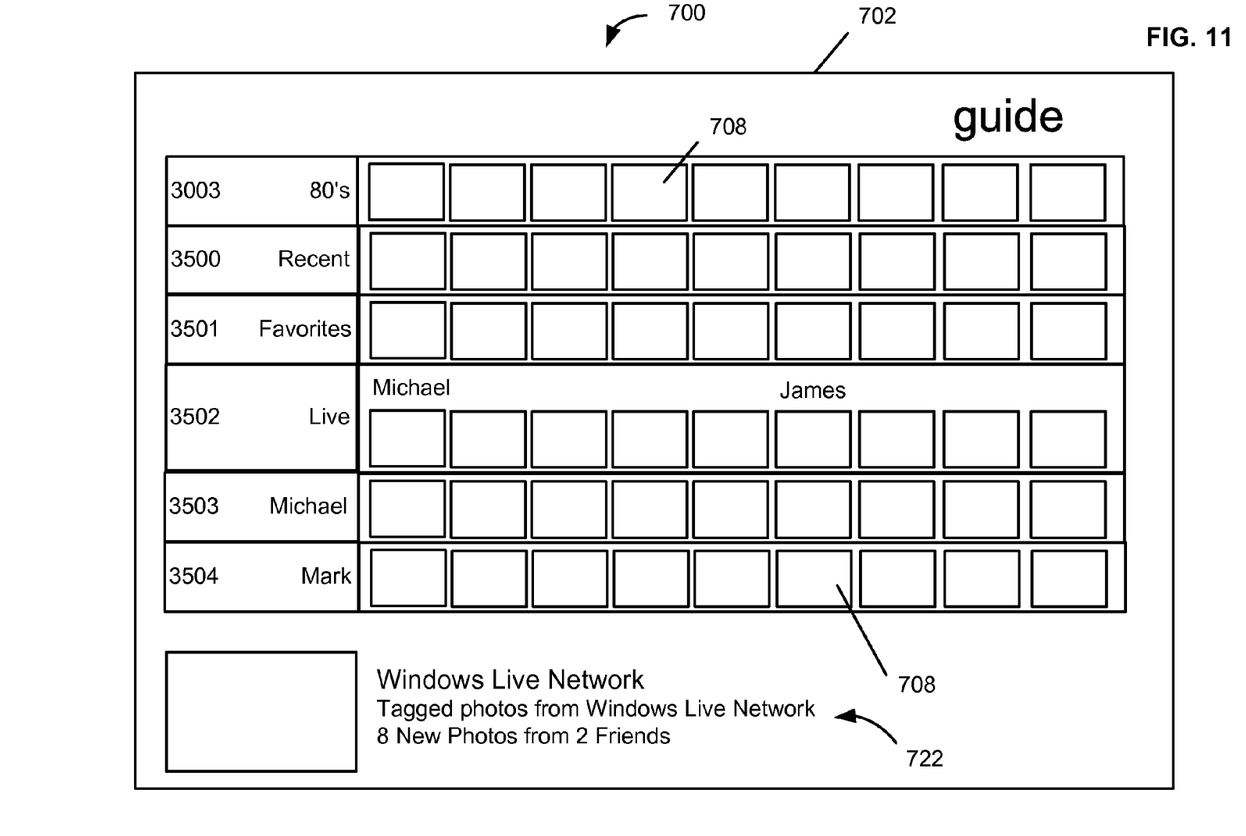
FIG. 11 depicts the EPG shown in FIG. 10 with a virtual media channel selected by a user.

At step 312, the technology determines whether the user's personal media content in each content group may be added to an existing virtual channel or a virtual channel must first be created. If a virtual media channel exists in the EPG, the technology adds the media content in the group to the existing virtual media channel, at step 314. In some embodiments, a static image associated with each media file is added to the existing virtual media channel. In the instance of adding music content to a virtual channel, the static image may be an album cover, a title of the song, and the like. FIGS. 9-11 provide additional detail of displaying media content in a virtual media channel.

If, however, a virtual media channel for the group does not exist in the EPG, the technology adds a new virtual media channel in the conventional EPG within the range of channels reserved for the type of media, at step 316. In some embodiments, the title of the new virtual media channel is the tag associated with the group. In other embodiments, the user may customize the channel title. At step 318, the technology adds the media content associated with the group to the newly created virtual media channel.

Figure 4A:
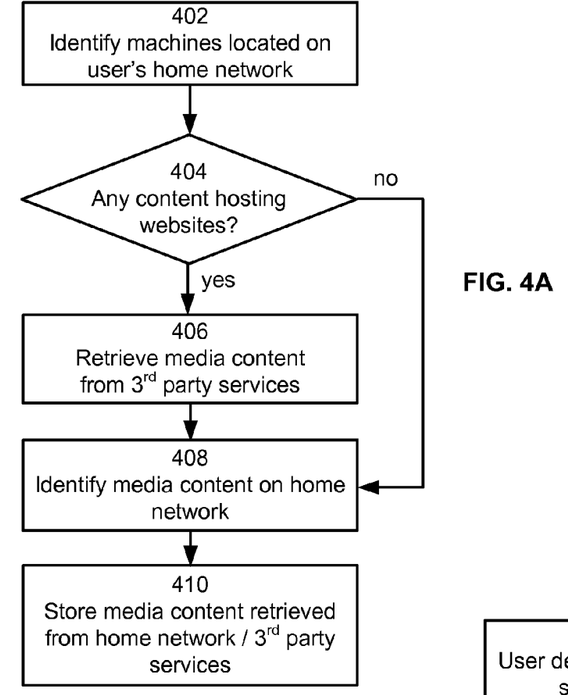
FIGS. 4A-4B depict flow diagrams illustrating exemplary steps of retrieving a user's personal media content.
Figure 4B:
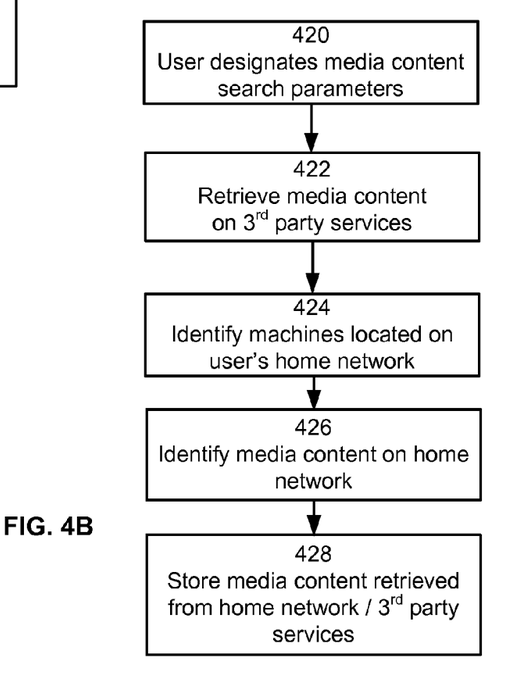

The system 100 attempts to locate and retrieve all of the user's personal media content located in the home network 101 and third-party services 103. FIGS. 4A-4B provide additional detail of retrieving the user's media content (step 302 in FIG. 3). FIG. 4A illustrates one embodiment of retrieving the user's personal media content from third-party services using the user profile database 122. At step 402, the technology identifies each and every machine located in the user's home network 101. Using the example provided in FIG. 1, the technology identifies several hardware devices, including a first personal computer (PC) 102, a storage device 104, a laptop computer 106, a set-top box 108 and a television 110. Programs exist today for detecting hardware existing on a user's home network, such as Microsoft's HomeGroup network sharing feature in Windows 7. Any technology known today for locating machines on a network may be used herein.

At step 404, the technology identifies any third-party services 103 that the user is affiliated with. Examples of third-party services include, but are not limited to, Flickr, FaceBook, a personal website or blog, and the like. In some embodiments, the technology requires a user to log into the EPG with a user identifier and password. In this instance, the technology may identify the third-party service 103 associated with the user identifier via the user information database 122. The technology may also identify the user's friends (via the user information database 122), and identify any third-party services associated with each of the user's friends.

If the technology detects at least one third-party service 103 associated with the user (or a friend), the technology proceeds to retrieve the media content from each of the third-party services 103, at step 406. In the instance of a third-party service that requires user authentication (e.g., Flickr, Facebook, etc.), the technology first authenticates the user using the information stored in the user information database 148. In some embodiments, the technology proceeds to obtain the user's images using two separate calls to the third-party website: a first call to obtain the albums associated with the user and a second call to obtain the photos for that album. The same may be true for obtaining friend's images. The technology may first identify the user's friends via the user information database 148, and then obtain each friend's images that have granted permission to the user to do so using two separate calls: a first call to obtain the albums associated with a friend and a second call to obtain the photos for that album. In other embodiments, the technology obtains the user's images and friend's images using a single call to each third-party service 103.

At step 410, the technology stores the personal media content retrieved from the home network 101 and each third-party service 103 in the content database 146. If the personal media content is located on the user's local network 101, it may not be necessary to store the media content files in some embodiments. Instead, it maybe sufficient to store the metadata associated with the media file and a URL to the content in the content database 146. This would reduce the amount of storage space required by the content database 146, and simplify management of multiple content libraries. For personal media content located on a third-party service 103, in some embodiments, caching the media files in the content database 146 may improve performance and ensure that the user has access to the personal media content before being displayed via a hardware device. In other embodiments, only metadata and a URL associated with each instance of personal media content identified on third-party services 103 may be stored in the content database 146.

If, however, the technology does not detect any third-party services 103 associated with the user or any of the user's friends, at step 404, the technology proceeds to identify media content located on the user's home network 101, at step 408. The machines on the user's home network 101 have been identified at step 402. Thus, at step 408, the technology retrieves all media files from the machines. In some embodiments, the technology searches for media libraries stored on each machine, and retrieves the media content form each media library. In other embodiments, the technology searches each and every directory of each machine for media files.

FIG. 4B illustrates an embodiment whereby the user designates which third-party services 103 should serve as a source of personal media content for the EPG. At step 420, the user designates specific third-party services 103. By way of example only, the EPG may include a user interface (not shown) whereby the user may designate each third-party service 103. In some embodiments, each third-party service may be designated by its Uniform Resource Locator (URL). In other embodiments, the user interface may provide a predetermined list of third-party services that the user may individually select. At step 422, the technology retrieves the user's personal media content from each third-party service 103 designated by the user. As discussed above, in some embodiments, the technology retrieves the media files from the third-party service 103 and stores the media files in the content database 146. In other embodiments, the technology retrieves the metadata and URL associated with each media file and stores this information in the content database 146. The user may also request to have friend's personal media content retrieved from the third-party service.

At step 424, the technology identifies each machine located in the user's home network 101. Using the example provided in FIG. 1, the technology identifies several hardware devices, including a first personal computer (PC) 102, a storage device

104, a laptop computer 106, a set-top box 108 and a television 110. At step 426, the technology identifies the personal media content stored on each machine located in the home network 101 and retrieves the metadata and URL associated with each media file. It is also within the scope of the technology to retrieve each media file. The technology then stores the information and/or files retrieved from the third-party services 103 and the machines on the home network 101, at step 428.

Figure 5:
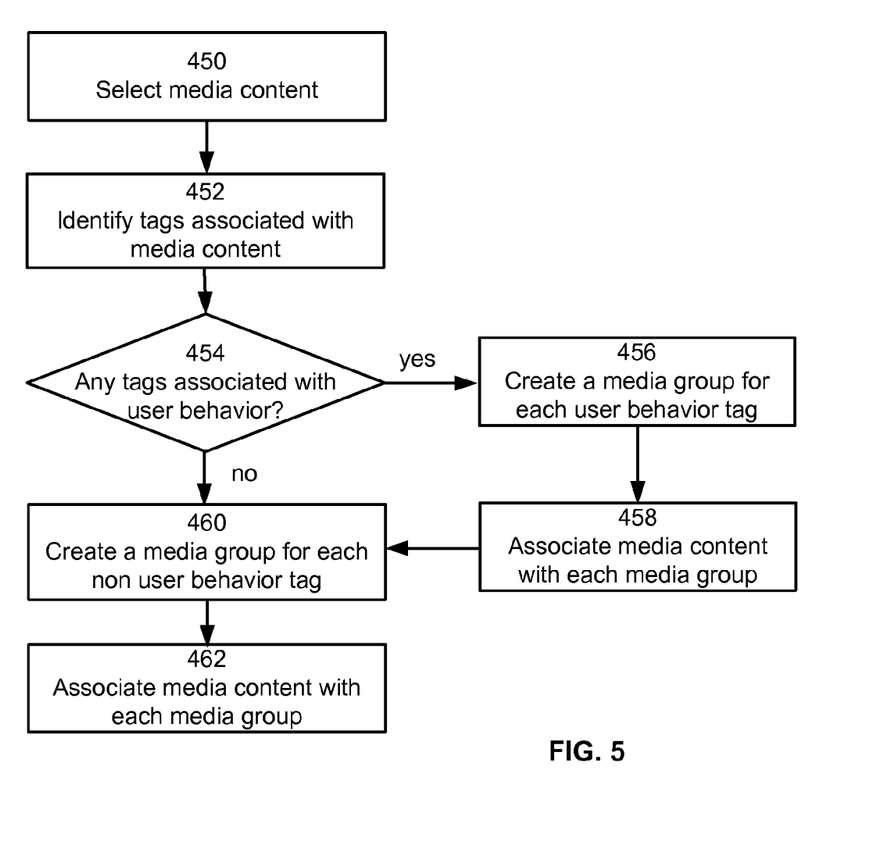
FIG. 5 depicts a flow diagram illustrating exemplary steps of sorting the user's personal media content into groups.

FIG. 5 provides additional detail of sorting the media files aggregated by type of media into groups of content organized by tag (step 310 in FIG. 3). The steps shown in FIG. 5 are performed for each media file. At this point, the technology has organized the user's media content into music file, image files, etc. In some embodiments, the technology performs the steps shown in FIG. 5 asynchronously per type of media. In other embodiments, the technology performs the steps shown in FIG. 5 synchronously for each type of media.

At step 450, the technology selects a media file. At step 452, the technology identifies the tags associated with the media file. It is not uncommon for a media file to be labeled with more than one tag. Metadata entries vary by the type of media content. For example, metadata often associated with music files includes, but is not limited to, the artist name, album name, album art (CD cover), track (song) name, track number and CD number (in the case of a multiple CD set). Metadata related to a user's behavior may also be added to a media file. For example, media programs, such as Windows Media Player, add tags to media files such as, ratings, favorites, playlists, and the like. Windows Media Player automatically rates a user's digital media collection based on the user's listening and viewing habits (e.g., files that the user frequently plays receive a higher rating in the 1-5 star scale). A user may also manually rate songs themselves in their media library, adds songs to a playlist, create a new playlist, and so on. Metadata associated with image files includes Exchangeable image file format (Exif) tags, as well as tags added by users including the names of the people in the photograph, the location the photograph was taken, the date the photograph was taken, and so on. These examples of metadata are not intended to limit the scope of the technology described herein.

Tags related to user behavior may be more indicative of the user's interest in the media content than other tags associated with the music file (e.g., genre of music, artist, etc.). Thus, the technology ensures that a virtual media channel is created for each user behavior tag. At step 454, the technology determines if any of the tags identified at step 452 are associated with the user's behavior. For example, suppose the technology selected a music file at step 450 labeled with "Favorites—4 and 5 star rated," "Favorites—Listen to on Weekdays," "70's," and "Rock," tags. At step 454, the technology identifies the "Favorites—4 and 5 star rated" and "Favorites—Listen to on Weekdays" tags as user behavior tags added by a digital media player. At step 456, the technology creates two media groups: a "Favorites—4 and 5 star rated" media group and a "Favorites—Listen to on Weekdays" media group. At step 458, the technology adds two additional tags to the music file: a "Favorites—4 and 5 star rated" media group tag and a "Favorites—Listen to on Weekdays" media group tag.

In some embodiments, a virtual channel is added to the EPG for every tag associated with the media content. In the above example, the technology therefore creates a "70s" media group and a "Rock" media group for each of the remaining tags associated with the music file, at step 460. At step 462, the technology adds a "70s" media group tag and a "Rock" media group tag to the music file. Steps 450-462 are repeated for each media file, creating multiple groups of media each associated with a single tag.

Figure 6:
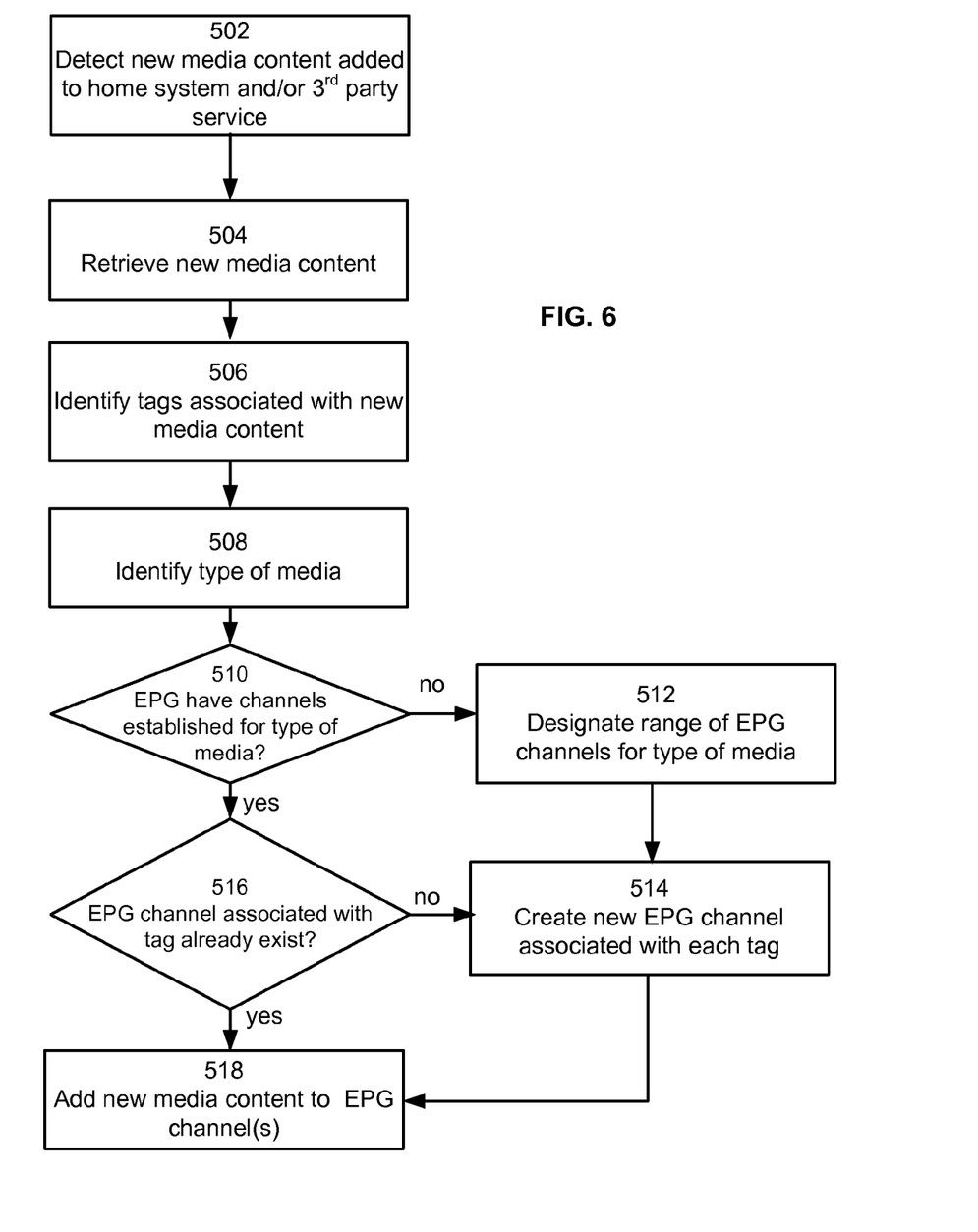
FIG. 6 depicts a flow diagram illustrating exemplary steps of creating a virtual media channel based on new media content added to a user's media library.
Figure 7:
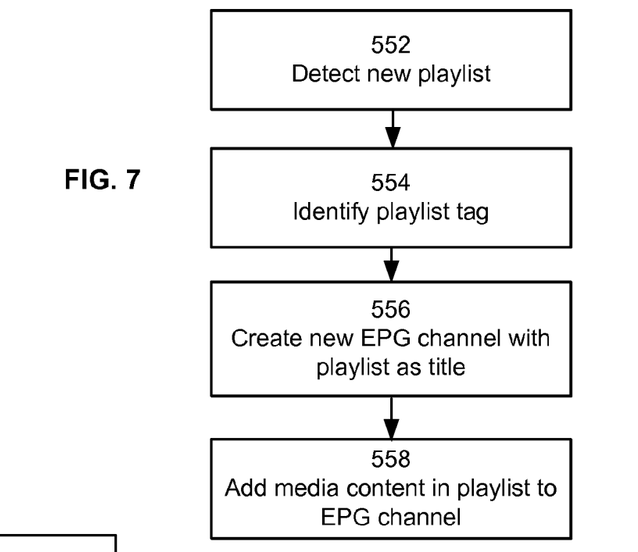
FIG. 7 depicts a flow diagram illustrating exemplary steps of creating a virtual media channel based on a new playlist.
Figure 8:
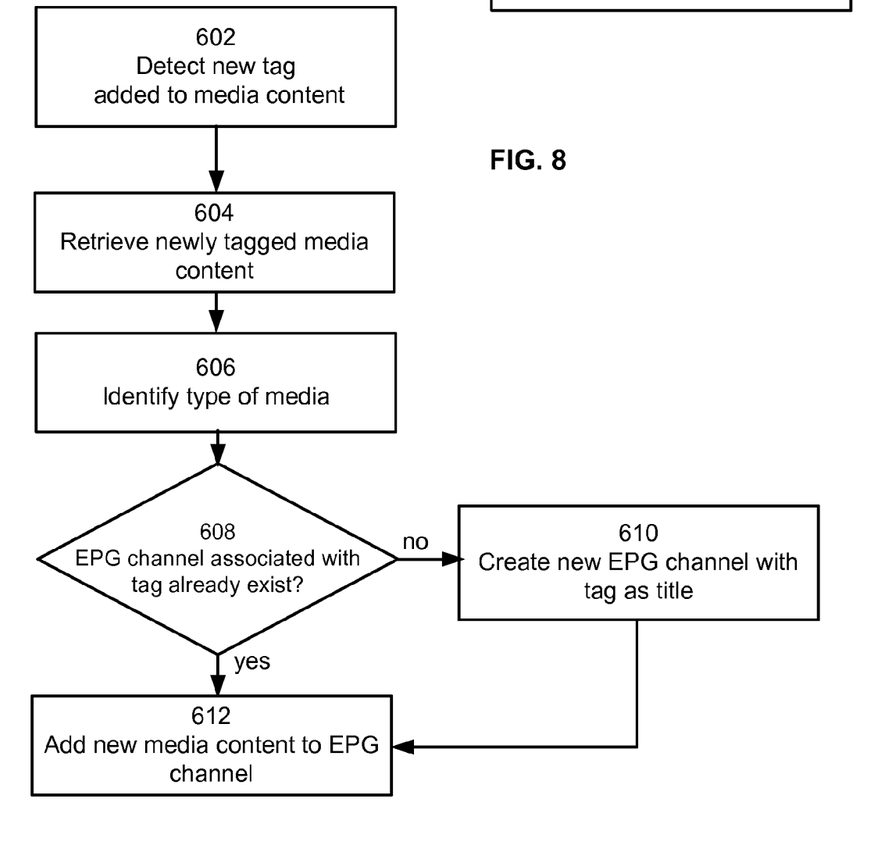
FIG. 8 depicts a flow diagram illustrating exemplary steps of creating a virtual media channel based on a new tag added to a piece of media content.

FIGS. 6-8 provide various examples of creating a virtual media channel upon new media content being added to the user's home network 101 (e.g., downloads a music file) or a third-party service 103 (e.g., uploads a new photograph) after the EPG has initially been populated with virtual channels (see FIG. 3). In particular, FIG. 6 illustrates that the technology described herein may detect the addition of new media content. At step 502, the technology detects that new media content has been added to the home network 101 and/or a third-party service 103. In some embodiments, the technology detects the new media as soon as the new media is added to the home network/website. In other embodiments, the technology scans the home network and each third-party service at predetermined time intervals and thus intermittently detects new content. Alternatively, a user can force the technology to scan available networks by selecting a "scan" button (not shown) in the UI 700 (see FIGS. 9-11).

At step 504, the technology retrieves the new media content detected at step 502. For the purpose of describing the technology only, suppose the user purchased a song and downloaded the song into their media library stored on PC 102 in their home network. Thus, at step 504, the technology retrieves the newly downloaded music file. At step 506, the technology identifies the tags associated with the media content. At step 508, the technology identifies the type of media. Using the example provided above, the technology identifies that the new media content is a music file (step 508) and has been labeled with a "90s" tag and a "Disco" tag (step 506).

At step 510, the technology determines if the EPG has already designated a range of virtual music channels. In some embodiments, the user may manually reserve channel ranges in the EPG via a configuration tool (not shown). In other embodiments, the technology determines that existing range of broadcast television channels in the EPG, and reserves a range of channels for each type of media. If a range of music channels has been reserved, the technology determines if a "90s" and "Disco" virtual music channel have already been created in the EPG, at step 516. If a "90s" channel and "Disco" channel exist in the EPG, the technology adds the music file to both the "90s" channel and "Disco" channel, at step 518. As a result, the music file will be located in two different virtual music channels.

If, however, the technology determines that there is no designated range of virtual music channels, at step 510, the technology reserves a range of virtual music channels in the EPG for music, at step 512. The technology creates a "90s" channel and "Disco" channel, at step 514, and adds the music file to the newly created "90s" channel and "Disco" channel, at step 518.

FIG. 7 provides an illustration of adding a new virtual media channel and media content based on a new playlist added to a user's media library. As discussed above, a playlist may be added to the user's media library either manually by the user or automatically by a digital media player. At step 552, the technology detects a newly added playlist. At step 554, the technology identifies the playlist tag added to each music file in the playlist. At step 556, the technology creates a new virtual music channel titled with the playlist tag in the EPG. In some embodiments, the technology identifies the next available virtual music channel and assigns the channel number to the new virtual channel. At step 558, the technology adds the music files in the playlist to the virtual music channel. In some embodiments, a static image of the album cover of each music file is displayed in the "Mike's all-time favorites" channel. The order of the static images with in the channel may vary.

FIG. 8 illustrates an example of adding a virtual channel to the conventional EPG based on a new tag added to media content. At step 602, the technology detects a new tag added to media content. By way of example only, a user adds a new tag, "Hawaii," to a digital photograph stored on a third-party service 103. At step 604, the technology retrieves the newly tagged digital photograph and identifies the type of media at step 606.

At step 608, the technology determines if the EPG contains a virtual image channel titled "Hawaii." If the EPG has a virtual image channel titled "Hawaii," the technology adds the digital photograph with the "Hawaii" tag to the "Hawaii" channel, at step 612. If the technology, at step 608, determines that the EPG does not have a "Hawaii" virtual image channel, the technology creates a "Hawaii" virtual image channel, at step 610 and adds the digital photograph with the "Hawaii" tag to the newly created "Hawaii" virtual image channel, at step 612.

FIGS. 9-11 illustrate an EPG displaying various virtual media channels. FIG. 9 illustrates an exemplary EPG 700 displaying the last existing broadcast television channel 892 in the EPG, and then transitioning to virtual music channels. Thus, the virtual channels are displayed in-line with the existing broadcast television channels in the EPG. The EPG 700 includes a display window 702 having available channels 704 and a content gallery 706. As shown in FIG. 9, the window 702 displays six virtual channels at a time and nine images per virtual channel. A viewer may navigate within the EPG 700 in a manner similar to a conventional EPG to view additional content within a certain virtual channel and view additional virtual channels.

The six virtual music channels shown in FIG. 9 include: channel 3001 ("Party" music channel), channel 3002 ("70's" music channel), channel 3003 ("80's" music channel), channel 3004 ("New" music channel), channel 3005 ("Favorites" music channel), and channel 3006 ("Jazz" music channel). The virtual music channels begin at channel 3001 to avoid any conflict with existing broadcast television channels in the EPG. Using the FIG. 9 example, the existing broadcast television channels in the EPG end at channel 892. The virtual music channels are configured to appear like conventional broadcast television channels that a user is already familiar with. The six virtual music channels were added to the EPG 700 because, when the music files were sorted into groups of content (step 310 in FIG. 3), a "party" group, a "70's" group, a "new" music group, an "80's" group and a "jazz" group were created based on the tags associated with the music files. Each song in the virtual music channel 3002 was added to channel 3002 because the music file was labeled with a "70's" tag and was sorted into a "70's" group. Each song in virtual music channel 3006 was added to channel 3006 because the music file was labeled with a "jazz" tag and was sorted into a "jazz" group.

Each virtual music channel displays music content 708 available for selection by the user. In some embodiments, the music content displayed in a virtual music channel is a static image 708 associated with a song. In other embodiments, each instance of music content 708 displayed in a virtual music channel is the title of the song. The EPG 700 is exemplary only, and is not intended to limit the scope of the technology described herein. Each virtual channel may include any number of songs, and each channel may contain a different number of songs.

Upon a user selecting a song 708 in a virtual music channel, the display window 702, in some embodiments, displays additional details associated with the song. In one instance, the display window 702 provides an information window 712 that displays an image 710 associated with the selected song, and a summary of the song details such as, but not limited to, the name of the album (MX Dance), the title of the song (Get up and dance) and the duration of the song (3:20 minutes). In one embodiment, the information and image displayed in the information window is obtained from one or more tags associated with the selected song. The image 710 may be various images such as, but not limited to, a static image of the album cover, a static image of the artist, a music video associated with the song, as the like.

FIG. 10 illustrates that the EPG 700 may contain virtual image channels. As shown in FIG. 10, the available virtual image channels 704 of the EPG 700 include three image channels in the display window 702: channel 3500 is a "Recent" image channel, channel 3501 is a "Favorites" image channel, and channel 3502 is a "Live" image channel. The virtual image channels begin in the EPG at channel 3500. By doing so, 499 channels in the EPG 700 are reserved for virtual music channels (channels 3001-3499), which provides room in the EPG to add virtual music channels in the EPG as the user adds music files to a network, adds new tags to a music file, and so on. In addition, a user looking to find his personal images will know to always look to channels 3001-3499 in the EPG 700.

Channel 3500 in the EPG 700 is "Recent" virtual image. The images in channel 3500 may come from the user's home network or a third-party service. The actual location of the content is transparent to the user. As shown in FIG. 10, the digital images displayed in channel 3500 have been organized by day: November 1, November 2, etc. The technology may have retrieved more than five images labeled with "November 1" and more than four images labeled with "November 2." In some embodiments, channel 3500 may be organized by month, year, etc. if the number of images included in channel 3500 is very large. However, in an effort to display images from more than one day in the window 702, only images 1-5 are displayed for November 1 and only images 1-4 are displayed for November 2. The dates displayed in channel 3500 are based on tags associated with each image. FIG. 10 shows that user has highlighted image 3 in channel 3500 (shown in FIG. 10 as a bolded border). A user may navigate with channel 3500 to view additional images in the channel that are not currently viewable in the window 702. The number of photographs shown in channel 3500 for each date is exemplary only, and is not intended to limit the scope of the technology.

After selecting channel 3500, a user may navigate within the channel to select a certain image. In some embodiment, the dates "November 1" and "November 2" are selectable by user to view all images associated with the date. The display window 702 provides a preview pane 720 of the image currently highlighted in the channel. This preview pane 720 is larger than the thumbnail image shown in channel 3500, which makes it easier for the user to view the image before selecting the image in the channel. The display window 702 also provides an information section 722, which displays that channel 3500 includes fifteen images. Thus, six more photographs are available for viewing in channel 3500 that are not currently displayed in window 702. In some embodiments, the row height of a channel increases in size when selected by a user, as shown in FIG. 10 where a user has selected channel 3500. The row height of channel 3500 is larger than the other channels displayed in the window 702 for ease of viewing. This feature is not required.

FIG. 11 illustrates additional virtual image channels. In FIG. 11, a user has selected channel 3502, which displays digital images 708 associated with the user's Windows LIVE friends. Channel 3502 provides an easy way for the user to locate and view all images associated with his LIVE friends, instead of having to visit each of the friend's websites. Once selected, the row height of the channel increases to reveal the names of two of the user's friends: Michael and James. The technology may have retrieved more than five images associated with Michael and more than four images associated with Jim (see FIG. 3 steps). However, channel 3502 displays only five photographs associated with Michael and four photographs associated with James in an effort to display more than one friend in the viewable portion of the window 702. In some embodiments, channel 3502 is populated first with photographs from favorite friends. Alternatively, channel 3502 may be populated first with the most recent images (e.g., Michael has the most recent photos). Similar to FIG. 10, in some embodiments, a user may select the friend's name displayed in the channel (Michael or James) to view all images associated with the person.

Upon selecting channel 3502, the information section 722 provides a summary of the contents of the LIVE channel 3502. Using the example shown in FIG. 11, the information section 722 displays that the images in channel 3502 are images from friends in the Windows LIVE Network. The information section 722 also displays that channel 3502 currently includes eight new photos from two different friends. In some embodiments, the new images in channel 3502 are highlighted.

An image 708 may be located in more than one virtual image channel. Channel 3503 displays images associated with the user's friend "Michael," which includes images labeled with the tag "Michael," such as images from the user's home network 100, images from any of the third-party services storing the user's images, images from websites associated with Michael (e.g., Michael's Flickr account, Facebook account, etc.), and so on. In the instance whereby the "Michael" shown in channel 3502 is the same person associated with channel 3503, similar images may be included in channel 3502 as well as channel 3503. The same is true for music content, video content, and the like.

Content added to a virtual channel may be organized in many different ways because a virtual channel does not have a fixed time line like a conventional broadcast television channel in an EPG. In some embodiments, the EPG may organize the media content within each virtual channel by date (e.g., most recent image first, most recently purchased song first, etc.). In other embodiments, the way the EPG organizes the content within each virtual channel may be media-specific. For example, in a virtual image channel, the EPG may organize the images within a virtual channel by date, highest rated, rating of friends, and so on. In other embodiments, images within a channel may be organized by tags (e.g., images within the LIVE channel 3502 are grouped together by friend). In the instance of a virtual music channel, the EPG may organize the music content within a virtual channel by date, highest rated, most often played, by album, and so on. These organization patters are exemplary only, and are not intended to limit the scope of the technology described herein. Organization patterns may vary per virtual channel.

It is also possible that a group of content is associated with more content than can be displayed at one time in the window 702. Using an example of a virtual music channel, it is possible that the technology identifies 200 jazz songs in the user's media library on the home network 101. The EPG 700 shown in FIGS. 9-11 displays a total of nine songs in a virtual channel in the window 702 at any one time. In this instance, the technology identifies the organization pattern associated with the virtual jazz channel and populates the channel in that manner (e.g., most often played songs displayed first).

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method for displaying media content to a user, comprising:
    identifying one or more friends of the user using a user information database;
    aggregating personal media content, the personal media content includes a first set of media content associated with the user and a second set of media content associated with the one or more friends;
    sorting the personal media content into a plurality of groups of personal media content;
    creating a plurality of virtual media channels for the plurality of groups of personal media content with each virtual media channel of the plurality of virtual media channels corresponding to one of the plurality of groups of personal media content, a first virtual media channel of the plurality of virtual media channels includes a first media content of the first set of media content associated with the user and a second media content of the second set of media content associated with the one or more friends;
    adding the plurality of virtual media channels to an electronic program guide in-line with existing broadcast television channels in the electronic program guide; and
    displaying the electronic program guide.

2. The method as recited in claim 1, wherein the aggregating personal media content includes acquiring the second set of media content associated with the one or more friends from one or more third-party services, the first virtual media channel includes a first image from the first set of media content and a second image from the second set of media content.

3. The method as recited in claim 1, wherein the second set of media content includes at least one of a music file, an image file, or a video file.

4. The method as recited in claim 1, wherein the adding the plurality of virtual media channels to an electronic program guide comprises the steps of:
    identifying a range of channel numbers currently being used by the electronic program guide for broadcast television;
    designating a new channel number for each group of the plurality of groups of personal media content, wherein each new channel number does not overlap with the range of channel numbers currently being used by the electronic program guide for broadcast television; and
    adding a new virtual channel to the electronic program guide for each group of the plurality of groups of personal media content, wherein each new virtual channel is associated with the channel number designated for the group.

5. A method for displaying media content to a user, comprising:
- identifying one or more friends of the user using a user information database;
- detecting that new personal media content has been added to a network, the new personal media content includes a first set of media content associated with the user and a second set of media content associated with the one or more friends;
- retrieving the new personal media content from the network;
- identifying at least one tag associated with the new personal media content retrieved from the network, the identifying at least one tag associated with the new personal media content includes identifying metadata entries associated with the new personal media content;
- determining a type of media associated with the new personal media content, the type of media associated with the new personal media content including at least one of music, photograph, or video;
- selecting a subset of the metadata entries;
- creating a group for each metadata entry within the subset of the metadata entries;
- associating the new personal media content with one or more groups created for the subset of the metadata entries;
- identifying at least one virtual media channel in an electronic program guide associated with the new personal media content, wherein the at least one virtual media channel is displayed in the electronic program guide in-line with existing broadcast television channels, a first virtual media channel of the at least one virtual media channel includes a first media content of the first set of media content associated with the user and a second media content of the second set of media content associated with the one or more friends;
- adding the new personal media content to the at least one virtual media channel identified in the electronic program guide; and
- displaying the electronic program guide.

6. The method as recited in claim 5, wherein the step of adding the new personal media content comprises:
- determining an organization pattern for each virtual media channel associated with the new personal media content;
- identifying a position in each virtual media channel for displaying the new personal media content based on the organization pattern associated with the virtual media channel;
- retrieving a static image associated with the new personal media content; and
- populating each virtual media channel with the static image in the position identified for displaying the new personal media content.

7. The method as recited in claim 5, wherein the detecting that new personal media content has been added to a network comprises detecting that new personal media content has been added to a third-party service associated with the user.

8. The method as recited in claim 5, wherein the identifying at least one virtual media channel comprises:
- determining the virtual media channels in the electronic program guide associated with the type of media; and
- identifying virtual media channels affiliated with a tag associated with the new personal media content.

9. The method as recited in claim 8, wherein the adding the new personal media content comprises:
- adding the new personal media content to each virtual media channel affiliated with a tag associated with the new personal media content.

10. A method for displaying media content to a user, comprising:
- identifying one or more friends of the user using a user information database;
- generating an electronic program guide containing virtual media channels in-line with broadcast television channels, the virtual media channels display personal media content, the personal media content including a first set of media content associated with the user and a second set of media content associated with the one or more friends, the generating an electronic program guide including:
  - retrieving the personal media content;
  - aggregating the personal media content by type of media; and
  - further sorting the personal media content into a plurality of groups of personal media content, each group of the plurality of groups of personal media content corresponding with a virtual media channel of the virtual media channels, a first virtual media channel of the virtual media channels includes a first media content of the first set of media content associated with the user and a second media content of the second set of media content associated with the one or more friends; and
- displaying the electronic program guide.

11. The method as recited in claim 10, wherein the type of media aggregated includes one of music, photograph, and video.

12. The method as recited in claim 1, wherein the first virtual media channel includes a first image from a first website associated with a first friend of the one or more friends and a second image from a second website different from the first website associated with a second friend of the one or more friends.

13. The method as recited in claim 1, wherein the first set of media content associated with the user includes a first plurality of images from a first website and the second set of media content associated with the one or more friends includes a second plurality of images from a second website different from the first website, the first virtual media channel includes a first image of the first plurality of images and a second image of the second plurality of images.

14. The method as recited in claim 13, wherein the first image comprises the most recent image of the first plurality or images displayed on the first website and the second image comprises the most recent image of the second plurality of images displayed on the second website.

15. The method as recited in claim 1, wherein the first set of media content associated with the user is acquired from a home network associated with the user and the second set of media content associated with the one or more friends is acquired from a third-party service, the first media content comprises music content and the second media content comprises video content.

* * * * *